March 3, 1964    R. B. SCHULZE    3,122,860
INSULATED PANELS FOR REFRIGERATED VEHICLES
Filed Feb. 20, 1959    4 Sheets-Sheet 1
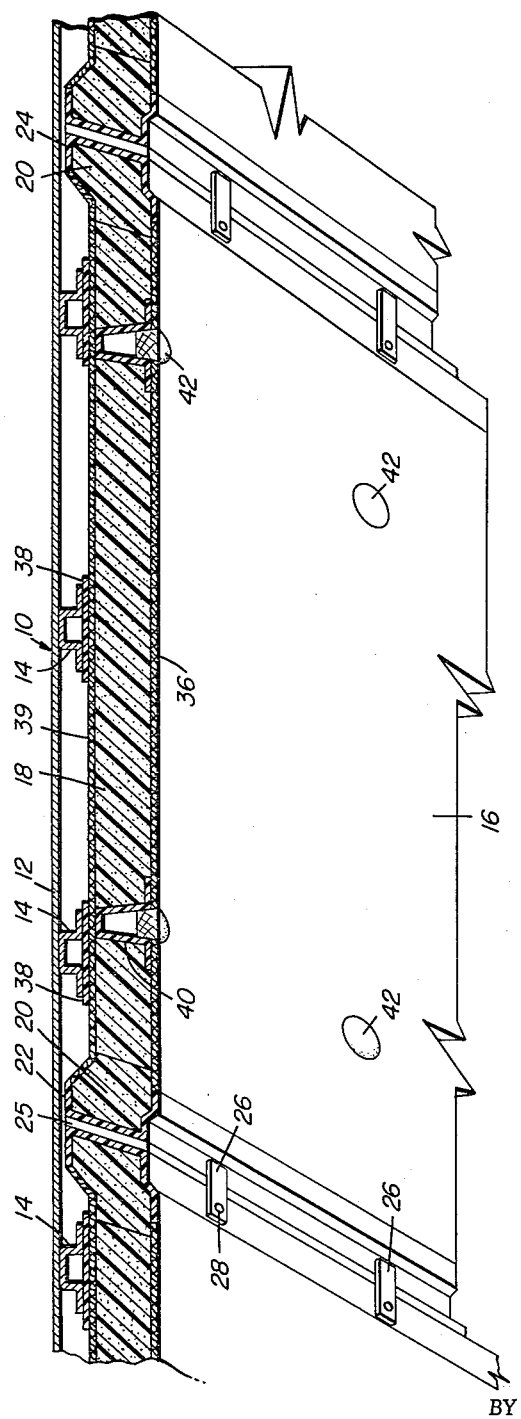
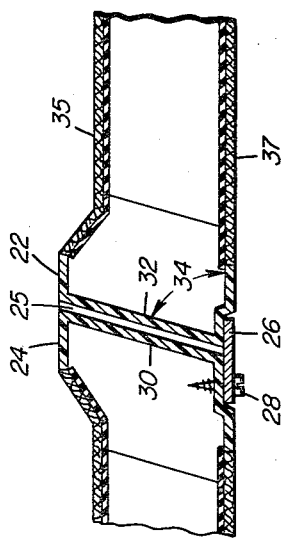
INVENTOR
Richard B. Schulze
BY Diggins & LeBlanc
ATTORNEYS

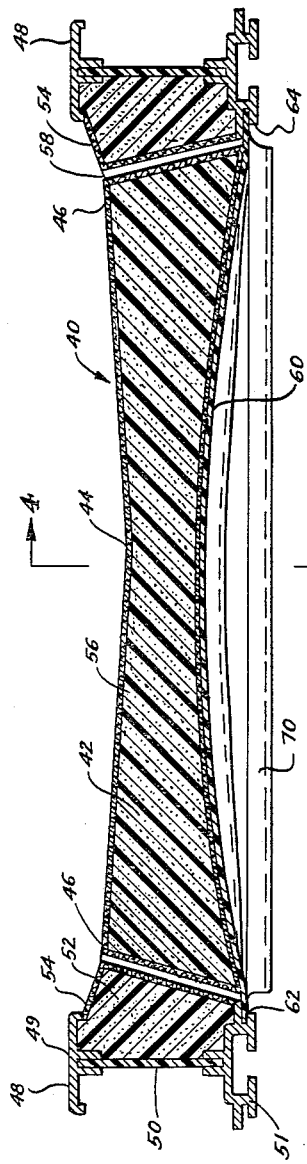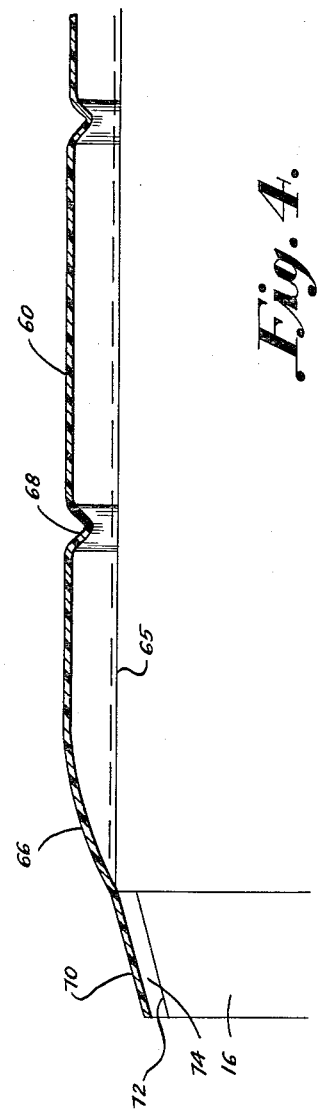

March 3, 1964 R. B. SCHULZE 3,122,860
INSULATED PANELS FOR REFRIGERATED VEHICLES
Filed Feb. 20, 1959 4 Sheets-Sheet 3

Richard B. Schulze
INVENTOR.

BY
Diggins & LeBlanc
Attorneys

March 3, 1964     R. B. SCHULZE     3,122,860
INSULATED PANELS FOR REFRIGERATED VEHICLES
Filed Feb. 20, 1959     4 Sheets-Sheet 4

Richard B. Schulze
INVENTOR.

BY Diggins & LeBlanc
Attorneys

United States Patent Office 3,122,860
Patented Mar. 3, 1964

3,122,860
INSULATED PANELS FOR REFRIGERATED
VEHICLES
Richard B. Schulze, Towson, Md., assignor to The Englander Company, Inc., Baltimore, Md., a corporation of Maryland
Filed Feb. 20, 1959, Ser. No. 794,559
3 Claims. (Cl. 50—268)

This invention relates to insulated or refrigerated trucks and trailers and more particularly is concerned with improvements in the panel construction of the insulated interior of truck or trailer bodies.

In the manufacture or construction of insulated trucks or trailers, it is possible to build the insulating walls around the framing of the truck or trailer by inserting the insulating material or medium at the time the panels are assembled to the truck or trailer frame. On the other hand, it is also possible to manufacture a truck or trailer of this type by assembling or attaching completely preformed panels to the truck or trailer frame members. This invention relates to panels of the latter type and to an improved method of assembling and joining such panels.

The novel panel assembly of the present invention provides standardized prefabricated panels which may be quickly and easily installed or removed with a minimum of effort. Because of the simplicity and flexibility of the panel and joint construction the panels may be readily adapted to a variety of truck or trailer body sizes and are interchangeable and individually replaceable. The assembly exhibits excellent thermal characteristics with maximum strength and minimum weight. Important features are the absence of moisture pick-up and the absence of metal ties or fastenings through the panels and joints thus avoiding any metallic heat conducting paths through the insulating medium. Interchangeable and varied linings may be used with the panels of the present invention as well as various fastening arrangements for attaching the panels to a truck or trailer frame at any of a number of different locations or fastening points.

It is accordingly a primary object of the present invention to provide an improved insulated panel construction for refrigerated vehicles.

Another object of the present invention is to provide an improved assembly of insulated panels for refrigerated vehicles.

Still another object of the present invention is to provide an improved insulated construction for the interior of truck or trailer bodies.

These and further objects and advantages of the invention will be more apparent upon reference to the following specification claims and appended drawings wherein:

FIGURE 1 is a perspective view of a portion of one wall of an insulated truck body showing in cross section the details of the wall construction;

FIGURE 2 is an enlarged view of one of the panel joints of FIGURE 1;

FIGURE 3 is a cross section through a truck body roof panel constructed in accordance with the present invention;

FIGURE 4 is a partial cross section through a roof panel at right angles to the cross section of FIGURE 3;

Figure 5:
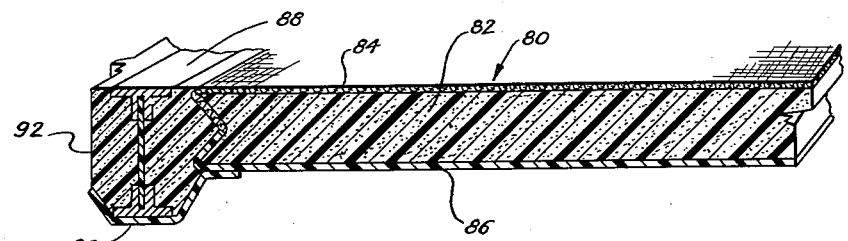
FIGURE 5 is a partial cross section through an insulated truck floor panel constructed according to the present invention.

Referring to FIGURES 1 and 2 of the drawings, the side wall of a refrigerated truck or trailer body constructed according to the present invention and generally indicated at 10 comprises the conventional outer trailer skin 12 and plurality of trailer side posts 14 extending vertically at spaced points along the walls of the trailer body and forming a portion of the body frame. Frame members or posts 14 and skin 12 are formed of any suitable metal with skin 12 preferably constructed of light weight, high strength aluminum.

An individual insulating panel indicated at 16 comprises a central foam core 18 constituting the major portion of the panel material. While any of the well known plastic foams may be employed for core 18 it is preferred that the core be constructed of styrene bead foam in which the beads have been pre-expanded and the whole core molded to a standard size foam blank. A foam of this construction represents a substantial reduction in both weight and cost over the lowest density urethane foam presently available. However, if desired, low density urethane foam may also be employed for making the core 18.

Suitably adhered to each edge of central core 18 is a strip of urethane foam 20. The incorporation of two separate foam materials in the panel construction provides several advantages, one of which is that a very light weight foam material is employed over the major portion of the panel while a stronger foam material is incorporated along the edges of the panel for increased strength. In addition, the urethane foam strips 20 along each edge of the panel more readily adhere to a pair of plastic channel members 22 and 24 which terminate each edge of the panel 16. The urethane foam strips thus provide means for bonding the core 18 to the terminating strips of the panel while at the same time offering the advantages of filling all corners and crevices by its inherent self-expanding and "filling in place" qualities.

In forming panels of the type under consideration, it is desirable that the same basic panel construction be applicable to trailers and trucks of different sizes. By means of the construction disclosed and particularly by varying the size of urethane strips 20 it is possible to use the same core stock 18 in making many different sized panels. However, for major size changes it is preferable to utilize different sized cores of various standard widths.

The plastic edge pieces or terminating strips 22 and 24 are formed of extruded plastic as right and left hand mating members more clearly seen in FIGURE 2. With this construction, members 22 and 24 are of light weight but have sufficient strength to allow any unevenness or mismatch in the alignment of the interior faces of adjacent panels to be eliminated by the panel fastening means comprising a metal clip 26 and attachment screw 28. While only two such clips 26 are disclosed at each joint in FIGURE 1, it will be understood that any number might be employed and that four or five of these clips spaced along a single joint are usually sufficient to adequately fasten adjacent panels.

Through the use of individual clips 26 each fastened by a single screw 28, it is possible to substantially reduce the installation time necessary for assembling the panels. The employment of a single screw for each of the fastening clips is made possible by tapering the mating edges of adjacent panels as indicated at 30 and 32 in FIGURE 2. The angle between the face of panel 16 and the central web of plastic terminating member 22, which angle is indicated at 34, is less than 90°.

By offsetting each of the screws 28 to the left of the center line through each clip as clearly seen in FIGURE 2, each screw upon being tightened through a plastic member 24 and into a urethane strip 20 causes tapered edges 30 and 32 to pinch the opposing panel edges together against a suitable rubber or flexible plastic foam sealing strip 25 to form a tight, secure joint. When the panels are assembled and fastening means 26 tightened, the two adjacent sloping edges 30 and 32 with gasketing seal 25 inserted between them are brought into a compressive position by the action of screws 28 causing a strong airtight joint.

The angle of edges 30 and 32 is chosen to enhance this pinching action and also to provide sufficient clearance for the ready removal and replacement of an individual panel. Through the choice of a suitable angle indicated at 34 it is possible to obtain both the pinching action described and yet permit any one wall panel to be removed without the necessity of removing other panels. The angle is such at each joint on each side of every panel that when all screws are removed a panel can be rotated about its right hand edge and withdrawn.

A primary feature of the novel panel construction of the present invention is that both edges of each panel are thicker than the remaining center portion forming the bulk of the panel. That is, urethane strips 20 at each panel junction possess a greater thickness than core 18 making up the major central portion of the panel structure. It can be shown that in panels of uniform thickness, the major portion of the heat losses is occasioned at the panel joint. In other words, the heat transmission through the joints is greater than through intermediate portions of the panel. By making only the joint portions of the panels thicker, it is possible to improve the overall efficiency and yet reduce the heat loss at the joints to the point where the bulk of the panel can be reduced in thickness below that normally required. The obvious economical advantage resulting is the much less material required in making a thickened joint than would be required in making the entire panel thicker.

An important feature of the construction disclosed is that the thickened edges of the panels occur at locations intermediate the spaced side wall posts 14 of the trailer body. As a result the thickened edge does not reduce the useful space inside the trailer body but conversely the reduced thickness of the core 18 of the panel serves to increase the amount of useful space inside the trailer.

Suitably secured to the inner and outer surface or faces of each panel 16 are sheets of suitable material such as non-woven fabric, paper and the like, but preferably woven material sheets 36 and 39 made of cotton, Dynel, fiber glass or nylon. Although cotton is the most economical of these latter materials, it has been found to have a lower impact value than nylon. Hence, the choice of material for the surface skins 36 and 39 depends upon the particular application wherein the necessity for impact resistance is necessarily balanced against the lower cost of less efficient materials. In respect to the particular material constituting skins 36 and 39, each skin is preferably applied to core 18 by means of an intermediate layer of a conventional adhesive as indicated at 35 and 37 in FIGURE 2. Such an adhesive in securing the coverings to the core acts as an additional vapor barrier for the panel. This covering on the panel has the effect of increasing the surface life of the panel in contact with the operating elements and also helps to prevent abuse from handling and other sources. The incorporation of an adhesive forming an additional moisture vapor barrier while not essential adds to the superior barrier qualities of the core 18 and improves the overall efficiency of the panel.

If desired, outer skin 39 may be separated from each of the posts 14 by a narrow plastic buffer strip 38 which prevents the panel from being damaged when brought into contact with the post.

Inserted at spaced points in the panel 16 are a plurality of plastic cups 40 which are permanently fastened into the panel core. Each of the cups 40 is internally threaded to receive a threaded wooden plug 42. Cups 40 with cooperating plugs 42 are placed as required throughout the panel assembly with their number and location depending upon the severity of the abuse anticipated.

In installing the panels in a trailer body, each panel is placed against the wall posts 14 and suitable holes are drilled through the bottom of the plastic cups 40. Short screws are then inserted through the bottoms of the cups and screwed into the metal posts 14. These screws are ordinarily only long enough to penetrate the post material and should be short enough to insure that they will not extend through aluminum skin 12.

A wooden plug 42 is then inserted into each of the plastic cups 40 preferably by means of mating screw threads on the respective cups and plugs. If desired, suitable adhesive may be employed to securely fasten the plugs in the cups. It is also possible to provide the wooden plugs 42 with foam tips which fill the rest of the area in each cup. This depends upon the contemplated usage and whether or not the heat loss in the absence of such foam tips is important. Ordinarily, they are not required.

The panels 16 are particularly suited for use in conjunction with replaceable interior wall liners. These wall liners are ordinarily screwed to the inner surface of each panel with the screws located in alignment with the plastic cup 40 so that the grip of each screw is into the wood plugs 42. Such liners when used in conjunction with panel 16 are readily removed and replaced by removing and reinserting screws into plugs 42. Obviously, as is sometimes advantageous, different wall liners may be employed on the same panel.

FIGURE 3 shows in cross section a panel constructed according to the present invention suitable for use as a roof or ceiling panel in a refrigerated vehicle. The roof panel generally indicated at 40 comprises a foam core 42 similar to core 18 of the panel shown in FIGURE 1 which tapers from each edge towards its center indicated at 44. Hence, the central area of the beam at 44 is narrower than the end portion 46. The increased thickness along each edge of the panel 40 permits a reduction in material required for each panel in a manner similar to that with respect to the panel described in FIGURES 1 and 2.

Separating adjacent panels is a suitable insulated beam such as a meat rail beam 48 for supporting meat carcasses, bannanas and the like including an insulating reinforced plastic web 50 and spaced metallic chords 49 and 51. Meat rail beams suitable for use in the present invention are described and claimed in assignee's copending application Serial No. 794,096, filed February 18, 1959.

Molded to meat rail beam 48 at each end of panel 40 is a urethane foam strip 52. Strips 52 are covered on two sides by a skin 54 of woven or other suitable material which may be secured thereto by a suitable adhesive in the manner of the embodiment shown in FIGURES 1 and 2. Core 42 is completely enclosed by a similar skin 56. Core 42 and surrounding skin 56 are separated from urethane strips 52 and their enclosing skins 54 by an intermediate sealing strip 58 of flexible foam. In addition, the inner surface of panel 40 is covered by a molded plastic face 60.

In assembling the insulated roof structure, a plurality of meat rail beams 48 are positioned as indicated across the ceiling of a trailer body and supported at each end by suitable means not shown. Meat rail beams 48 are placed in position with urethane foam strips 52 already foamed to and adhering to each side of the beam. The flexible foam sealing strips 58 are secured by suitable adhesive in order to adhere them to the foam strips 52 on the beams. Adhesive is also placed on the inside of the flexible sealing strips 58 before the panel comprising core 44 and plastic face 60 is inserted so that the adhesive will support the panel in rough position. The flexibility of seals 58 permits the panel to seat in its proper position even though the tolerance between the meat rail beams may vary from one panel to the next.

Once the panel is in position, the panel face 60 is inserted into a slot 62 provided in the flange of the lower chord 51 of one of the I-beams 48 and the opposite edge of surface 60 is then snapped into a similar groove 64 in the meat rail beam on the opposite side of the panel. As previously indicated, foam members 52 and 44 are covered by sheets similar to the covering of the panels shown in FIGURES 1 and 2. However, in the case of the roof panel, impact is not an important factor and a cotton material is ordinarily used for these coverings or skins. With the panel attached through the use of adhesive and a flexible seal and by means of a semi-rigid facing material such as plastic surface 60, it is able to readily absorb road vibration.

FIGURE 4 is a partial cross section through the plastic panel face 60 taken at right angles to the view shown in FIGURE 3. In this latter figure the panel is shown as being curved in a direction parallel to the fore and aft axis of a trailer. This curvature is indicated by the solid line 65 in FIGURE 4. It will be noted from the showing in FIGURE 4 that the plastic surface 60 is also curved in the direction at right angles to the longitudinal axis of a trailer. This curvature at one end of the member 60 is indicated at 66, and is necessary in order to attain a straight line junction where the roof panel and side wall panels meet.

Through the use of a plurality of beads 68 formed in surface 60 and the dish-like curvature of this surface previously described, it is possible to utilize a much thinner plastic material and yet attain satisfactory stiffness. The result is a reduction in the material required for the panel with a corresponding reduction in cost.

Plastic face 60 also includes at each end a flange portion 70 which juts down at an angle where it overlaps a side wall panel 16. This angle matches a bevel 72 formed on the top surface of the side wall panel 16. By providing a bevel at the top surface of each side wall panel it is easier to insert the panels in a trailer since the side wall panels are ordinarily put in a trailer after the roof and floor panel have already been put in place. A flexible foam sealing strip 74 is secured to the underside of flange 70 and helps retain the side wall panels 16 in proper relation to the roof panels 40.

Figure 6:
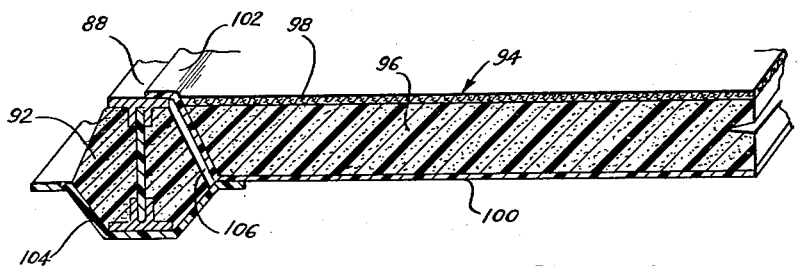
FIGURE 6 is a cross section through a modified floor panel similar to that shown in FIGURE 5.
Figure 7:
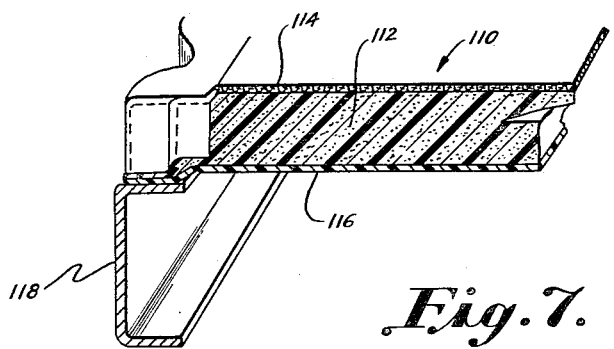
FIGURE 7 shows a portion of still another insulated floor panel constructed in accordance with the present invention.

FIGURES 5, 6 and 7 illustrate 3 different floor panels suitable for use in the floor construction of a refrigerated vehicle. FIGURES 5 and 6 illustrate panels used in conjunction with insulated floor framing structure while FIGURE 7 shows a panel superimposed upon the more conventional metal floor beams.

At the present time, most trailers are constructed with metal floor beams and any insulation added must necessarily be placed on top of those beams. This results from the fact that metal beams are notoriously good heat conductors. However, placing the insulation on top of the floor beam means that the floor depth is equal to the total depth of the beam plus insulation. It is obvious that the useful height inside the trailer can be increased if the floor beams are of the insulated type and the insulation is placed between the beams with the top surface at the same level as the tops of the beams. Many of the more recent trailer constructions have incorporated insulated beams into the floor construction for this purpose.

In FIGURE 5, a floor panel generally indicated at 80 comprises a central core 82 of foam construction of the type described in conjunction with the side wall panel and covered over its top surface by a woven sheet or skin 84 preferably of cloth and over its bottom surface by a molded plastic bottom face 86. The beam construction shown in FIGURE 5 is adapted to be used in conjunction with insulated floor structure wherein the joints are poured in place.

Insulated I-beams 88 similar in construction to the meat rail beams shown in FIGURE 3 but without the elongated channel in the lower chord are put in place, and lower skirts 90 are either formed integral with the beam or as shown in the drawing made of molded plastic and suitably secured to the lower chord of the beam. The panel 80 is then secured to skirt 90 by suitable means such as adhesive and screws. A suitable foam filler 92 is then foamed around beam 88 to make a junction between the beam and the adjacent panels. This filler is of suitable conventional foam material, preferably polyurethane foam as previously described.

FIGURE 6 shows an insulated panel for use in floor structures wherein the joints are pre-molded. In this figure, panel 94 again comprises a central foam core 96 with outer cloth skin 98 and inner plastic face 100. In this arrangement the shape of bottom face 100 is modified to include an upwardly extending flange 102 overlapping the upper chord of the insulated I-beam 88. In this construction the foam filler 92 is preformed about both the I-beam and lower skirt 104. A suitable flexible foam sealing strip 106 may either be adherred to the beam during assembly and before shipment or put in place at the time that the panels are inserted.

When the panels are inserted, each panel is forced down onto the flexible seal 106 which again allows for variations in tolerance in both size and location of adjacent beams. When the beam and panel are in correct position, screws are inserted through the flange of lower strip 104 into the underside of the panel and through the flange 102 of bottom face 100 into the upper surface of beam 88. Adhesive may be employed in both instances if desired.

In the constructions shown in both FIGURES 5 and 6 an aluminum floor is ordinarily placed on top of the panels shown in the normal fashion and the screws inserted into the upper chord of I-beam 88 to hold the aluminum to the beams.

FIGURE 7 shows a panel construction suitable for use where the insulated panels are superimposed upon a metal floor framing structure. In this case, a panel indicated at 110 again comprises a foam core 112 with an upper woven surface 114 and a lower molded plastic face 116. The panel is shown as resting upon a metal channel member 118 forming a portion of the floor frame.

Figure 8:
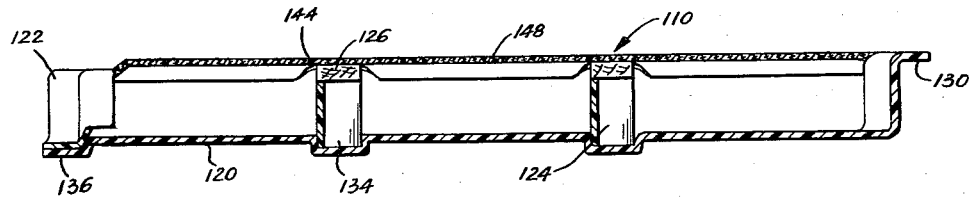
FIGURE 8 is a cross section through the entire panel of FIGURE 7.

FIGURE 8 is a cross sectional view showing the details of panel 110 and FIGURES 9 through 12 are perspective views of various elements making up this panel.

Figure 9:
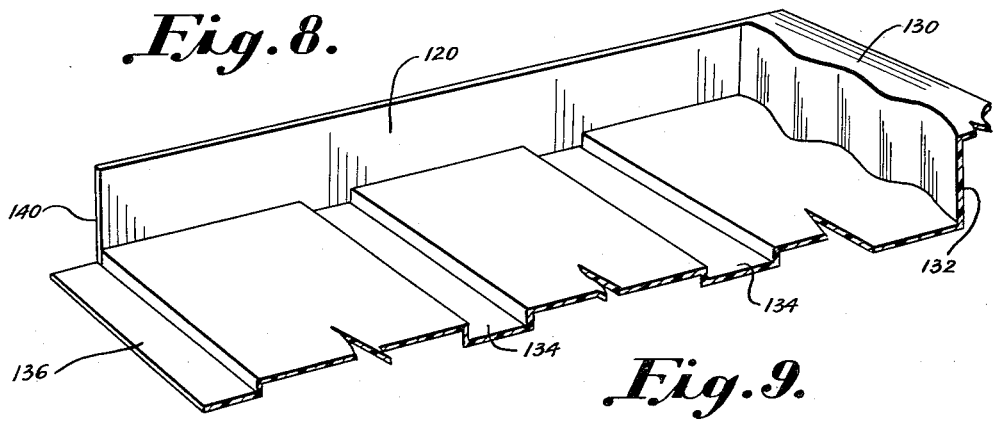
FIGURES 9 through 12 are perspective views of various individual elements making up the panel construction of the panel shown in FIGURES 7 and 8.
Figures 10, 11:
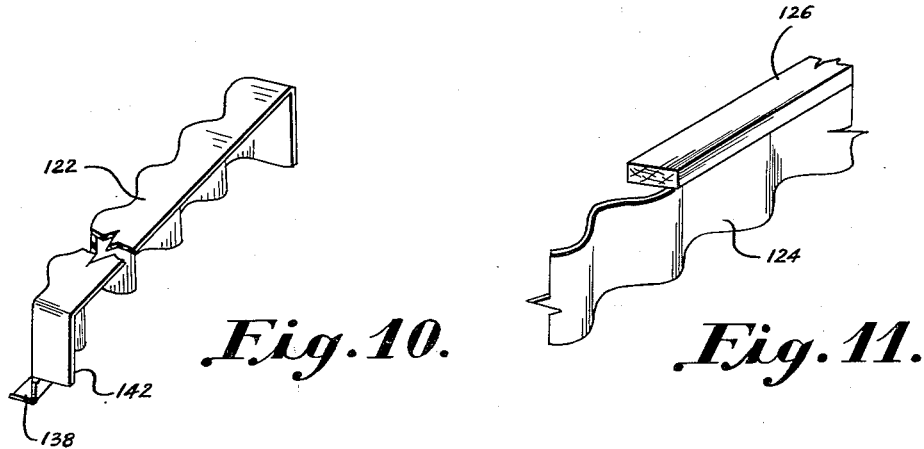
Figure 12:
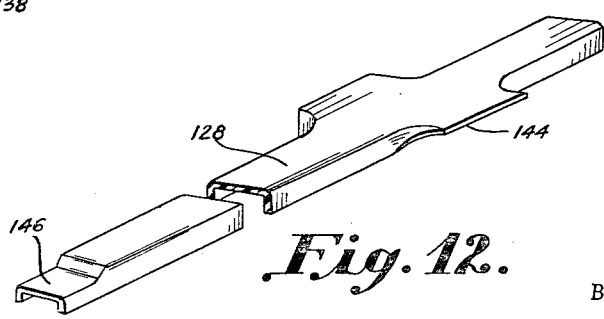

FIGURE 9 illustrates in perspective a portion of a bottom pan 120 forming the lower or bottom face 116 of the panel. Pan 120 is preferably formed of molded plastic. In FIGURE 10 is a corrugated edge member 122 also of plastic while FIGURE 11 shows one of a plurality of intermediate plastic reinforcing corrugated ribs 124 upon which are mounted wooden strips 126 positioned inside the panel. FIGURE 12 shows one of a plurality of stabilizing ribs 128 which extend at spaced intervals across the top of the panel.

Bottom pan 120 includes a flanged edge 130 adapted to fit over corrugated edge 122 of an adjacent panel when the panels are assembled. Extending downwardly from flange 130 is a corrugated integral edge plate 132 which adds strength and rigidity to the panel structure particularly for the purposes of withstanding vertical loads such as that of a lift truck used inside a trailer. The lower surface of bottom pan 120 is formed with a plurality of recesses 134 which are positioned at points in pan 120 corresponding to the position of each structural beam such as the beam 118 shown in FIGURE 7 in the floor of a trailer. Each of the recesses 134 receives one of the vertical corrugated ribs 124 supporting a wooden strip 126. At the end of bottom pan 120 opposite flange 130 is a second flange 136 adapted to engage a mating flange 138 along the lower edge of members 122. Vertical walls 140 similarly engage projections 142 on each side of edge members 122.

The corrugated constructin of intermediate vertical ribs 124 and end plates 136 is provided to support vertical loads with the lowest possible structural weight and cost. Stabilizing ribs 128 are ordinarily used in only three or four places across the width of an individual panel since the function of these stabilizing ribs is to support the edges of the panel and the interior corrugated support ribs 124 against rotation under a vertical load. The general channel shape of member 128 is altered at 144 to provide clearance for each of the wood strips 126, with a minimum of interference. The end of each stabilizing rib 128 is offset at 146 so that it passes under and may be attached to the appropriate flange on edge member 122.

When the various elements of the panel are assembled, a suitable foam material is poured into the interior and around ribs 128 and allowed to solidify. A cotton cloth upper face 148 is then placed on the top surface of the panel by appropriate vapor barrier adhesive as previously described. The panel is without a solid top, since only a few stabilizing ribs 128 extend across the panel at the top. However, there is a solid plastic bottom pan 120 on the underside of the panel which is more able to withstand the abuse from road spray than is the under surface of conventional constructions.

It is apparent that the present invention provides a novel panel assembly for insulated or refrigerated trucks or trailers and similar frozen food compartments having excellent thermal insulating properties and extremely light weight. The panel cores are in general of standardized construction providing for a wide variety of applications and extreme flexibility and interchangeability between panels so that the panels may be readily replaced and adapted to various size installations. In addition to the novel panel construction and joint structures shown, an important feature of the present invention is the provision of panels wherein the joint forming edges of the panels are of greater thickness than the remaining portion of the panel. This construction provides for an optimum use of material providing uniform insulation over the entire interior compartment surface and at the same time makes it possible to increase the usable space within the insulated area. The inclusion of resilient foam liners makes it possible to compensate for any variations in tolerance of the trailer frame or panel structure so as to provide effective seals and uniform internal surfaces. The panel assemblies are relatively inexpensive to manufacture and may be easily assembled while presenting substantial advantages in terms of cost, weight and versatility.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An insulated panel comprising a central foam resin core, a layer of woven material on each side of said core, each vertically disposed edge of said core having a urethane foam strip, said strips being substantially thicker than the core to thereby reduce heat loss through the panel at the edges thereof, the edges of said panel being beveled and lying in parallel planes intersecting one side of the panel at an acute angle, whereby adjacent panels may be readily removed and replaced, and substantially channel-shaped plastic members having spaced flanges connected by an integral web engaging the strips.

2. An insulating panel according to claim 1 in which the central foam resin core is a styrene bead foam core.

3. An insulated panel assembly for refrigerated trailers including a plurality of spaced vertical frame posts, a plurality of aligned edgewise abutting panels on one side only of the frame posts, each panel having a central foam resin core and edges of foam resin material substantially thicker than said central body portion, whereby heat loss through the abutting edges of adjacent panels is reduced, the edges of said panel being bevelled and lying in parallel planes intersecting one side of the panel at an acute angle, the said thicker edges extending beyond only the side of the panel assembly adjacent said posts at spaced points intermediate said posts whereby the thickened edges do not reduce the useful space within the trailer, means for joining said abutting edges of adjacent panels, and means intermediate said thickened edges for securing said panels to said frame posts.

References Cited in the file of this patent

UNITED STATES PATENTS

| | | |
|---|---|---|
| 2,390,564 | Tedrow | Dec. 11, 1945 |
| 2,768,046 | Evans | Oct. 23, 1956 |
| 2,791,264 | Couse | May 7, 1957 |
| 2,858,580 | Thompson et al. | Nov. 4, 1958 |

FOREIGN PATENTS

| | | |
|---|---|---|
| 163,968 | Australia | July 7, 1955 |